United States Patent [19]
Yanagi et al.

[11] Patent Number: 5,347,813
[45] Date of Patent: Sep. 20, 1994

[54] CAP FOR MASTER CYLINDER RESERVOIR

[75] Inventors: Kunio Yanagi; Toshiaki Satoh, both of Higashimatsuyama, Japan

[73] Assignee: Jidoshi Kiki Co., Ltd., Tokyo, Japan

[21] Appl. No.: 80,089

[22] Filed: Jun. 21, 1993

[30] Foreign Application Priority Data

Jul. 13, 1992 [JP] Japan ............... 4-054852[U]

[51] Int. Cl.⁵ .............................. B60T 11/26
[52] U.S. Cl. .......................... 60/585; 60/533; 220/208; 220/367; 137/493.9
[58] Field of Search .............. 60/533, 585; 220/203, 220/204, 208 X, 209, 367 X, 374; 137/493, 493.8, 493.9 X

[56] References Cited

U.S. PATENT DOCUMENTS

| | | | |
|---|---|---|---|
| 4,135,635 | 1/1979 | Fujii et al. | 220/367 |
| 4,198,524 | 4/1980 | Nogami et al. | 220/209 |
| 4,506,809 | 3/1985 | Eorgette | 137/493 |
| 4,666,057 | 5/1987 | Come et al. | 220/374 |
| 4,778,072 | 10/1988 | Newman | 220/367 |
| 5,136,847 | 8/1992 | Zander et al. | 60/585 |
| 5,269,431 | 12/1993 | Sakata et al. | 220/374 |

FOREIGN PATENT DOCUMENTS 61-24501  2/1986  Japan.

Primary Examiner—Thomas E. Denion
Attorney, Agent, or Firm—Birch, Stewart, Kolasch & Birch

[57] ABSTRACT

A cap which is so constructed that parts manufacture and product assembly are facilitated. The construction is such that a cap for a master cylinder reservoir connects a cover cap and a body cap with each other and a diaphragm is disposed in a space formed therebetween to provide a valve function. The cover cap has a concentric cylindrical portion and an annular protrusion, while the body cap has a funnel portion at its center and an annular disc portion at the periphery of the funnel portion. The diaphragm is fitted between the inner periphery of annular protrusion of the cover cap and the outer periphery of the funnel portion of the body cap. The diaphragm forms a suction valve and an exhaust valve together with the cylindrical portion and the annular disc portion, respectively.

2 Claims, 4 Drawing Sheets

5,347,813

CAP FOR MASTER CYLINDER RESERVOIR

FIELD OF THE INVENTION AND RELATED ART STATEMENT

The present invention relates to a cap suitable to a reservoir for a master cylinder used for an automobile brake unit or the like and, more particularly, to an improvement of the construction of the cap.

A conventional cap for a master cylinder reservoir of this kind is shown in a sectional view of FIG. 5.

In this figure, a cap 2 for a master cylinder reservoir 1 connects a cover cap 3 to a body cap 4 so that a space 5 formed therebetween communicates with the inside and the outside of the reservoir 1, and the cap 2 is provided with a diaphragm 6 in the space 5.

A suction valve 7 and an exhaust valve 8 are formed as a valve function between the diaphragm 6 and the cover cap 3 and between the diaphragm 6 and the body cap 4, respectively. Thus, the suction valve 7 or the exhaust valve 8 opens to let the inside of the reservoir 1 communicate with the outside thereof only when a differential pressure exceeding a specified pressure range is produced between the inside and the outside of the reservoir 1 (Japanese Utility Model Provisional Publication No. 61-24501 or No. 24501/1986 et.).

In the above-described conventional master cylinder reservoir 1, however, it is difficult to stably arrange the diaphragm 6 at the concentric position in assembling, and there is a problem in that the master cylinder reservoir is unsuitable to mass production because the assembler exhausts his/her nerves to prevent misalignment. If misalignment occurs, the opening/closing of the valves 7 and 8 becomes unstable or impossible.

OBJECT AND SUMMARY OF THE INVENTION

The present invention was made in view of the foregoing. Accordingly, an object of the present invention is to provide a cap for a master cylinder reservoir which solves the aforesaid problems and facilitates parts manufacture and assembly work.

To achieve the above object, the present invention provides a cap for a master cylinder reservoir in which a cover cap and a body cap are connected to each other, a passage communicating with the inside and the outside of the reservoir is formed in a space formed between the cover cap and the body cap, and a diaphragm is disposed in the space to provide a valve function, wherein (1) the cover cap has a cylindrical portion extending downward at the center on the lower surface and an annular protrusion which is formed downward on the outer side of the cylindrical portion, a groove traversing the annular protrusion being formed, the body cap has a funnel portion whose small-diameter side opens to a fluid storing chamber vertically at the center and a notch passage on the top of the large-diameter side, a groove being formed in the outer surface and the flat surface of the large-diameter side, the diaphragm has an annular fixed portion at the center in the radial direction, an annular lip portion yieldingly urged against the outer surface of the cylindrical portion of the cover cap on the inside of the annular fixed portion, and an annular valve portion yieldingly urged against the flat surface of the body cap on the outside of the annular fixed portion, the annular fixed portion of the diaphragm is fitted between the inner periphery of the annular protrusion of the cover cap and the outer periphery of the funnel portion of the body cap, the annular lip portion forms a suction valve together with the outer surface of the cylindrical portion of the cover cap, and the annular valve portion forms an exhaust valve together with the lower surface of the body cap.

(2) the cover cap has a groove on its lower surface, the body cap has a funnel portion whose small-diameter side opens to a fluid storing chamber vertically at the center and a notch passage on the top of the large-diameter side, a groove being formed in the outer surface and the flat surface of the large-diameter side, the diaphragm has an cylindrical fixed portion at the center in the radial direction, an inner annular valve portion yieldingly urged against the lower surface of the cover cap on the upper inside of the annular fixed portion, and an outer annular valve portion yieldingly urged against the upper surface of the body cap on the lower outside of the annular fixed portion, and the cylindrical fixed portion of the diaphragm is fitted to the outer periphery of the large-diameter side of the funnel portion of the body cap, and mounted between the lower surface of the cover cap and the upper surface of the body cap, the inner annular valve portion of said diaphragm forming a suction valve together with the cover cap, and the outer annular valve portion forming an exhaust valve together with the upper surface of the body cap.

Since the present invention is configurated as described above, the operation of the present invention is as follows:

The fixed portion of the diaphragm is fitted at a specified concentric position between the cover cap and the body cap,.and the annular lip portion and the annular valve portion of the diaphragm are yieldingly urged against the respective surface to provide a suction valve and an exhaust valve having the function of a check valve.

Only when a differential pressure exceeding a specified pressure range is produced between the inside and the outside of the reservoir, the suction valve or the exhaust valve opens to provide communication therebetween.

As is obvious from the above description, in a cap for master cylinder reservoir of the present invention, the fixed portion of the diaphragm is fitted at a specified concentric position between the cover cap and the body cap, and the valve bodies of the diaphragm are yieldingly urged against the respective surface of the cover cap and the body cap to provide a suction valve and an exhaust valve, so that the manufacture of parts composing the cap and the assembly of the cap are facilitated, thereby the cap for a master cylinder reservoir of the present invention being made suitable to mass production.

BRIEF DESCRIPTION OF THE DRAWINGS

In the drawings,

FIG. 4 shows a modified example of the second embodiment of the present invention, in which

DETAILED DESCRIPTION OF PREFERRED EMBODIMENT

Preferred embodiments of the present invention will be described below in detail with reference to the drawings.

Figure 1:
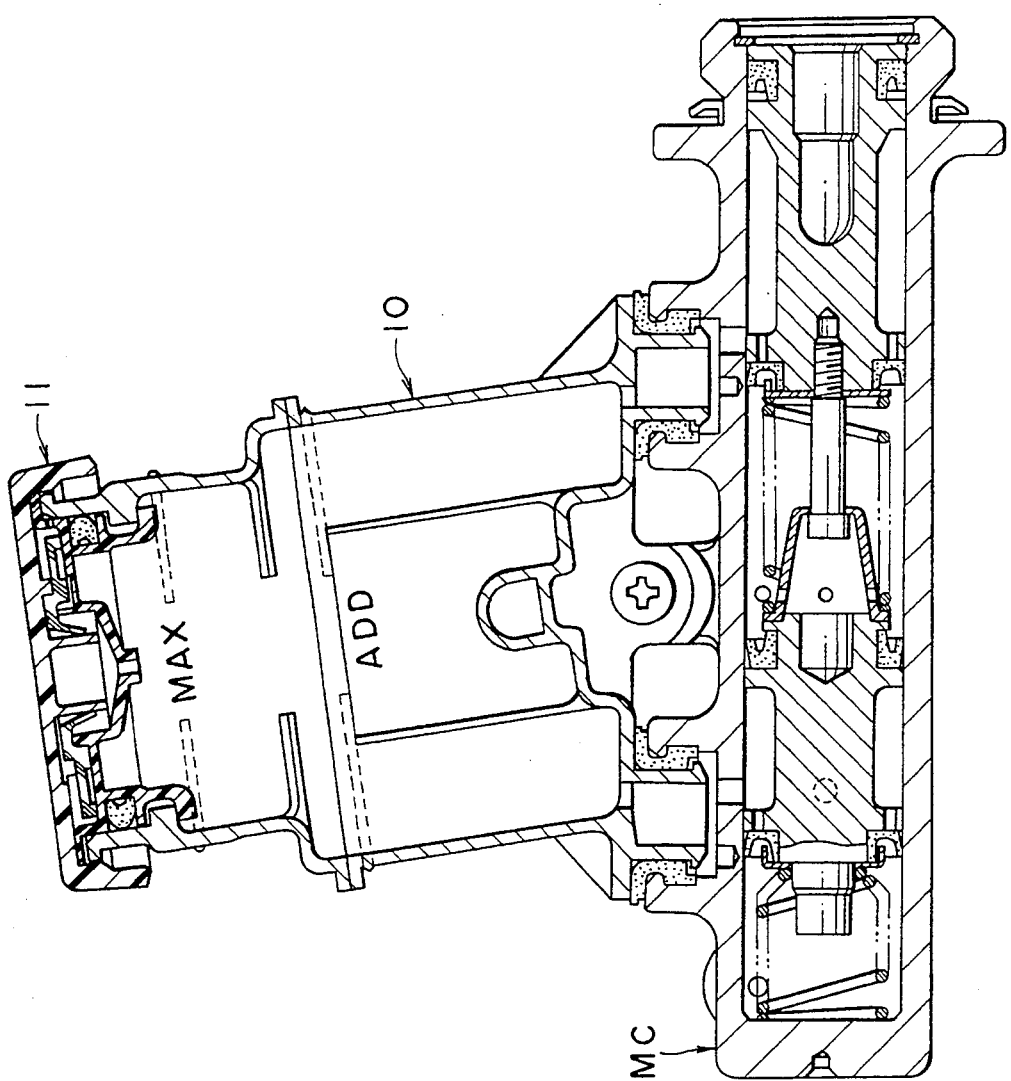
FIG. 1 is a sectional view of a cap for a master cylinder reservoir in accordance with one embodiment of the present invention, the cap being installed on a master cylinder reservoir.

FIG. 1 shows one embodiment of a cap 11 of the present invention which is installed on a reservoir 10. The figure also shows a master cylinder MC to which the reservoir 10 is directly installed to supply a working fluid to a master cylinder such as a tandem master cylinder.

First embodiment

Figure 2:
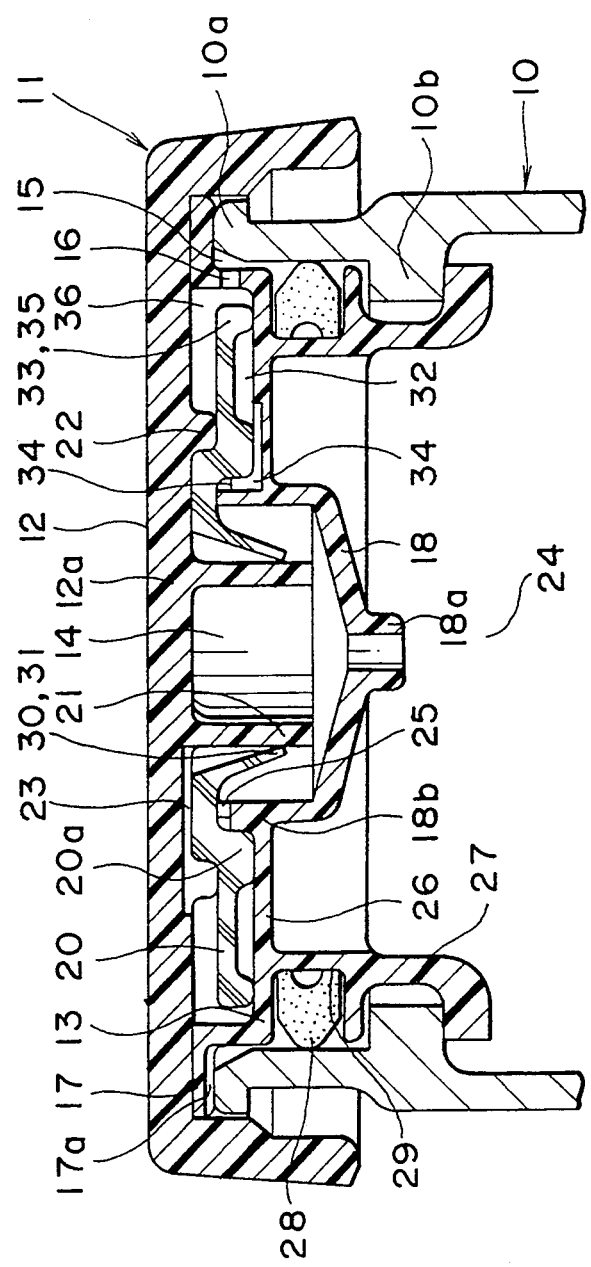
FIG. 2 is a sectional view of a cap in accordance with a first embodiment of the present invention.

FIG. 2 is a sectional view of a cap for a master cylinder reservoir in accordance with a first embodiment of the present invention.

In this figure, a cap 11, which is installed on an opening 10a of a reservoir 10, comprises a cover cap 12 and a body cap 13 connected with each other by welding to form an internal space 14 therebetween. The cover cap 12, which is made of, for example, synthetic resin, is disposed to cover the opening 10a. The body cap 13, which is made of, for example synthetic resin, is fitted to a protrusion 10b disposed on the inside of the opening 10a.

The internal space 14 communicates with an annular space 15, which is formed between the reservoir opening 10a and the external wall of the body cap 13, via a through hole 16 formed in the wall of the body cap 13. The annular space 15 communicates with the outside via a groove 17a formed at the bottom of a peripheral portion 17 of the body cap 13.

On the other hand, the internal space 14 communicates with the inside of the reservoir 10 via the small-diameter side 18a of a funnel portion 18 formed at the center of the body cap 13. In the internal space 14, an oilproof, flexible diaphragm 20, which is made of, for example, a rubber-base material, is installed to provide a valve function.

Specifically, a cylindrical portion 21 is disposed at the center of a disc portion 12a of the cover cap 12 on the side of internal space 14, and an annular protrusion 22 is formed on the outer side of the cylindrical portion 21 concentrically with the cylindrical portion 21. In addition, a groove 23, which extends across the annular protrusion 22 in the radial direction from the base end on the outer peripheral side of the cylindrical portion 21, is formed in the disc portion 12a.

The body cap 13 is provided with the funnel portion 18 whose small-diameter side 18a opens to a fluid storing chamber 24 vertically at the center of the body cap 13. One notch passage 25 is disposed at the top end of the large-diameter side 18b of the funnel portion 18, and an annular disc portion 26 extending radially from the outer peripheral surface of the large-diameter side 18b is formed.

The peripheral portion 17, which is formed at the upper part of the periphery of the annular disc portion 26, is connected to the disc portion 12a of the cover cap 12 by, for example, ultrasonic welding.

At the lower part of the periphery of the annular disc portion 26, a fitting portion 27 is formed which is fitted to the protrusion 10b disposed on the inside of the reservoir 10, and a circumferential groove 29 having a seal member 28 at its periphery is formed. Therefore, the body cap 13 is sealingly fitted to the reservoir 10 via the seal member 28.

For the diaphragm 20, its annular fixed portion 20a is fitted and fixed between an inner peripheral fitting portion, which is formed by the disc portion 12a of the cover cap 12 and the annular protrusion 22, and an outer peripheral fitting portion, which is formed by the large-diameter side 18b of the funnel portion 18 of the body cap 13 and the annular disc portion 26 thereof.

On the inside of the annular fixed portion 20a, an annular lip portion 30 is provided in such a manner that its end is yieldingly urged against the outer peripheral surface of the cylindrical portion 21 of the cover cap 12 to form a suction valve portion 31. The diaphragm 20 extends in the radial direction from the outer side of the annular fixed portion 20a so as to form a small chamber 32 between the diaphragm 20 and the annular disc portion 26 of the body cap 13, and the end of the diaphragm 20 is yieldingly urged against the annular disc portion 26 to provide an annular valve portion 33.

One groove 34, which communicates with the small chamber 32 from the notch passage 25 through a circumferential groove 34a formed at the outer peripheral surface of the large-diameter side 18b so as to stride the annular fixed portion 20a of the diaphragm 20, is formed so as extend from the outer peripheral surface of the large-diameter side 18b of the funnel portion 18 of the body cap 13 to the annular disc portion 26. This groove 34 is formed in such a manner that it is located on the side opposite to the position of the notch passage 25 in relation to the large-diameter side 18b, and forms an exhaust valve portion 35 at the annular valve portion 33 of the diaphragm 20.

Next, the operation of the cap 11 of the reservoir 10 will be described°

Even if the pressure in the fluid storing chamber 24 of the reservoir 10 changes for any reason (for example, heat due to brake actuation), the suction valve portion 31 and the exhaust valve portion 35 are kept in the closed condition when the internal pressure is within a specified differential pressure range with respect to the external pressure.

However, when the pressure in the fluid storing chamber 24 is lowered exceeding the specified differential pressure range with respect to the external pressure, the external pressure flows into an external pressure communicating space 36 in the cover cap 12 through the groove 17a, the annular space 15, and the through hole 16 of the cap 11. Further, the external pressure passes through the groove 23, and opens the suction valve portion 31 by pressing the annular lip portion 30, then being sucked into the fluid storing chamber 24 in the reservoir 10 via the funnel portion 18. In this case, the exhaust valve portion 35 is kept in the closed condition.

Inversely, when the pressure in the fluid storing chamber 24 is raised beyond the specified differential pressure range, the internal pressure is sent from the small-diameter side 18a of the funnel portion 18 of the body cap 13 into the funnel portion 18, and transmitted from the notch passage 25 of the large-diameter side 18b into the small chamber 32 via the circumferential groove 34a and the groove 34.

The internal pressure transmitted into the small chamber 32 opens the exhaust valve portion 35 by pressing the annular valve portion 33 of the diaphragm 20, then being exhausted to the outside through the external pressure communicating space 36, the through hole 16, the annular space 15, and the groove 17. In this case, the suction valve portion 31 is kept in the closed condition.

The valve opening pressure of the suction and exhaust valve portions 31 and 35 is determined by the hardness and dimensions of material of the diaphragm 20.

Since the annular fixed portion 20a of the diaphragm 20 is firmly fitted between the cover cap 12 and the body cap 13, the seat force of the valve body of the suction and exhaust valve portions 31 and 35 is stabilized, so that the opening/closing of the valve portions 31 and 35 is effected stably.

For the aforesaid cap 11, even if the working fluid in the fluid storing chamber 24 of the reservoir 10 leaps and enters the funnel portion 18 from the small-diameter side 18a of the funnel portion 18 of the body cap 13 due to sudden start of vehicle, sudden braking, running on slope, or vibration during running, the working fluid flows down rapidly because of the construction of the funnel, there being almost no possibility of the entrance of working fluid into the side of exhaust valve portion 35 from the notch passage 25 on the top of the funnel portion 18.

In assembling the cap 11, the cap 11 can be easily assembled because the diaphragm 20 is positioned in the correct installing direction while being fitted by the inner peripheral surface of the annular protrusion 22 of the cover cap 12 and the outer peripheral surface of the large-diameter side 18b of the funnel portion 18 of the body cap.

Second embodiment

Figure 3:
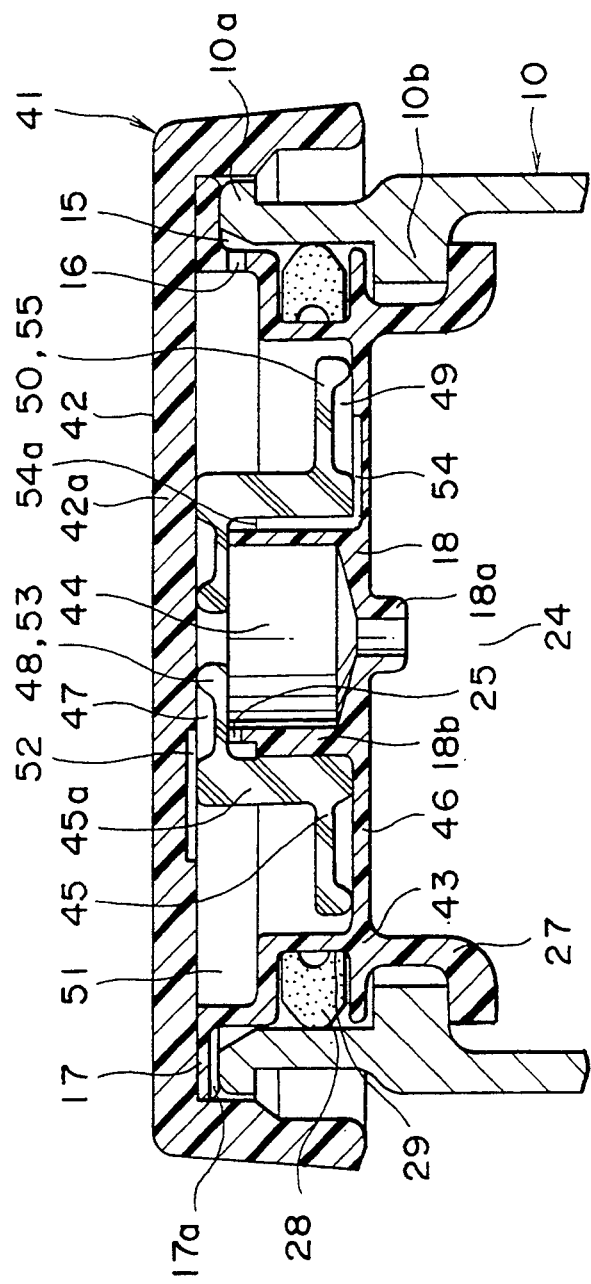
FIG. 3 is a sectional view of a cap in accordance with a second embodiment of the present invention.

FIG. 3 is a sectional view of a cap in accordance with a second embodiment of the present invention. The same reference numerals are applied to the same elements and parts as those in FIG. 2, and the explanation is omitted.

In FIG. 3, a cap 41 for a master cylinder reservoir connects a cover cap 42 to a body cap 43 by welding so that an internal space 44 formed therebetween communicates with the inside and the outside of the reservoir 10 via a through hole 16, an annular space 15, a groove 17a, and the small-diameter side 18a of a funnel portion 18. A diaphragm 45 is installed in the internal space 44 to provide a valve function.

The cover cap 42 consists mainly of a disc portion 42a. The body cap 43 is provided with the funnel portion 18 whose small-diameter side 18a opens to a fluid storing chamber 24 vertically at its center of the body cap 43, also provided with one notch passage 25 at the top end of the large-diameter side 18b, and has an annular disc portion 46 extending radially from the vicinity of the lower end of the outer peripheral surface of the large-diameter side 18b.

The diaphragm 45 is mounted and fixed between the lower surface of the disc portion 42a of the cover cap 42 and the annular disc portion 46 of the body cap 43 while its cylindrical fixed portion 45a is fitted to the outer peripheral surface of the large-diameter side 18b of the funnel portion 18 of the body cap 43.

The diaphragm 45 extends in the radial direction from the upper inner portion of the cylindrical fixed portion 45a so as to form a upper small chamber 47 between the diaphragm 45 and the disc portion 42a of the cover cap 42, and the end of the diaphragm 45 is yieldingly urged against the disc portion 42a to provide an inner annular valve portion 48.

On the other hand, the diaphragm 45 extends in the radial direction from the lower outer portion of the cylindrical fixed portion 45a so as to form a lower small chamber 49 between the diaphragm 45 and the annular disc portion 46 of the body cap 43, and the end of the diaphragm 45 is yieldingly urged against the annular disc portion 46 to provide an outer annular valve portion 50.

A groove 52, which communicates with the an external communicating space 51 connected to the outside of the reservoir 10 from the upper small chamber 47 so as to stride the cylindrical fixed portion 45a of the diaphragm 20, is formed in the disc portion 42a of the cover cap 42, so that a suction valve portion 53 is formed at an inner annular valve portion 48 of the diaphragm 45.

At the same time, a groove 54A, which communicates with the lower chamber 49 from the notch passage 25 so as to stride the cylindrical fixed portion 45a of the diaphragm 45, is formed so as extend from the outer peripheral surface of the large-diameter side 18b of the funnel portion 18 of the body cap 43 to the annular disc portion 46, so that an exhaust valve portion 55 is formed at the outer annular valve portion 50 of the diaphragm 45.

Next, the operation of the cap 41 of the reservoir 10 will be described.

Even if the pressure in the fluid storing chamber 24 of the reservoir 10 changes for any reason, the suction valve portion 53 and the exhaust valve portion 55 are kept in the closed condition when the internal pressure is within a specified differential pressure range with respect to the external pressure.

When the pressure in the fluid storing chamber 24 is lowered exceeding the specified differential pressure range with respect to the external pressure, the external pressure flows into the external pressure communicating space 51 in the cover cap 42 through the groove 17a, the annular space 15, and the through hole 16 of the cap 41. Further, the external pressure reaches the upper small chamber 47 through the groove 52, where it opens the suction valve portion 53 by pressing the inner annular valve portion 48, then being sucked into the fluid storing chamber 24 in the reservoir 10 via the funnel portion 18. In this case, the exhaust valve portion 55 is kept in the closed condition.

Inversely, when the pressure in the fluid storing chamber 24 is raised beyond the specified differential pressure range, the internal pressure is sent from the small-diameter side 18a of the funnel portion 18 of the body cap 43 into the funnel portion 18, and transmitted into the lower small chamber 49 via the notch passage 25 of the large-diameter side 18b, a circumferential groove 54a formed on the outer peripheral surface and a groove 54 formed at a position opposite to the notch passage 25 with respect to the large-diameter side 18b.

The internal pressure transmitted into the lower small chamber 49 opens the exhaust valve portion 55 by pressing the outer annular valve portion 50 of the diaphragm 20, then being exhausted to the outside through the external pressure communicating space 51, the through hole 16, the annular space 15, and the groove 17. In this case, the suction valve portion 53 is kept in the closed condition.

Other operations are similar to those in the above first embodiment.

Figure 4A:
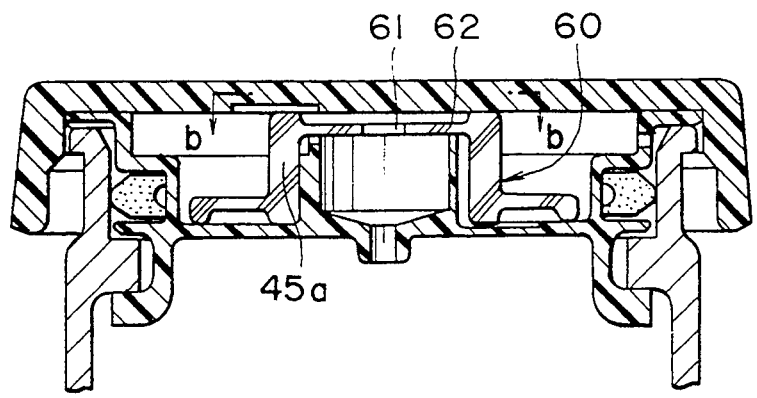
FIG. 4(a) is a sectional view and FIG. 4(b) is a partial plan view along the plane of line b—b of FIG. 4(a)
Figure 4B:
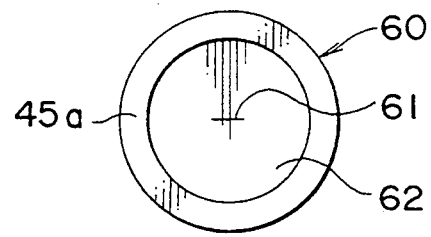
Figure 5:
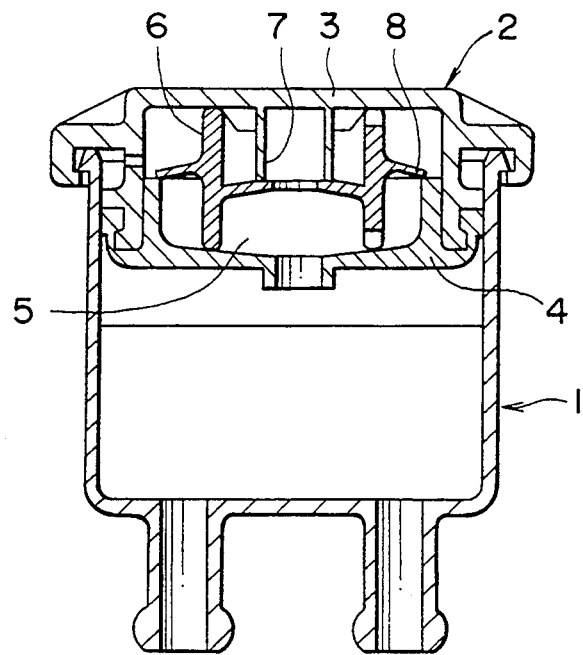
FIG. 5 is a sectional view of a conventional cap for a master cylinder reservoir.

FIG. 4 shows a modified example of the second embodiment of the present invention, in which FIG. 4(a) is a sectional view and FIG. 4(b) is a partial plan view along the plane of line b—b of FIG. 4(a).

A diaphragm 60 in this figure is such that a film portion 62 having a slit 61 at its center is formed radially on the upper inside of the cylindrical fixed portion 45a of the diaphragm 45 shown in FIG. 3.

The diaphragm 60 provides both functions of suction and exhaust valves via the slit 61. The valve opening pressure for both valves can be controlled by changing the length of the slit 61. The slit 61 is preferably set to be somewhat longer considering the pressure rise (for example, residual pressure) in the reservoir 10.

It is to be understood that the technique of this invention is not limited to the technique disclosed in the above embodiments, and other means having similar functions may be used, and in addition, the technique of this invention can be variously modified or added in the scope of the above configuration.

We claim:

1. A cap for a master cylinder reservoir in which a cover cap and a body cap are connected to each other, a passage communicating with an inside and an outside of the reservoir is formed in a space formed between the cover cap and the body cap, and a diaphragm is disposed in said space to provide a valve function, wherein said cover cap has a cylindrical portion extending downward at a center portion on a lower surface and an annular protrusion which is formed downward on an outer side of said cylindrical portion, a groove traversing said annular protrusion being formed, said body cap has a funnel portion with a small-diameter side opening to a fluid storing chamber vertically at a center portion and a notch passage on an upper portion of a large-diameter side, a groove being formed in an outer surface and a flat surface on said large-diameter side, said diaphragm has an annular fixed portion at a center portion in a radial direction, an annular lip portion yieldingly urged against an outer surface of said cylindrical portion of said cover cap inside of said annular fixed portion, and an annular valve portion yieldingly urged against said flat surface of said body cap outside of said annular fixed portion, said annular fixed portion of said diaphragm is fitted between an inner periphery of said annular protrusion of said cover cap and an outer periphery of said funnel portion of said body cap, said annular lip portion forms a suction valve together with said outer surface of said cylindrical portion of said cover cap, and said annular valve portion forms an exhaust valve together with a lower surface of said body cap.

2. A cap for a master cylinder reservoir in which a cover cap and a body cap are connected to each other, a passage communicating with an inside and an outside of the reservoir is formed in a space formed between the cover cap and the body cap, and a diaphragm is disposed in said space to provide a valve function, wherein said cover cap has a groove on a lower surface, said body cap has a funnel portion with a small-diameter side opening to a fluid storing chamber vertically at a center portion and a notch passage on an upper portion of a large-diameter side, a groove being formed in an outer surface and a flat surface on said large-diameter side, said diaphragm has a cylindrical fixed portion at a center portion in a radial direction, an inner annular valve portion yieldingly urged against said lower surface of said cover cap on an upper inner side of said cylindrical fixed portion, and an outer annular valve portion yieldingly urged against an upper surface of said body cap on a lower outer side of said cylindrical fixed portion, and said cylindrical fixed portion of said diaphragm is fitted to an outer periphery of said large-diameter side of said funnel portion of said body cap, and mounted between said lower surface of said cover cap and an upper surface of said body cap, said inner annular valve portion of said diaphragm forming a suction valve together with said cover cap, and said outer annular valve portion forming an exhaust valve together with said upper surface of said body cap.

* * * * *